Patented Oct. 15, 1940

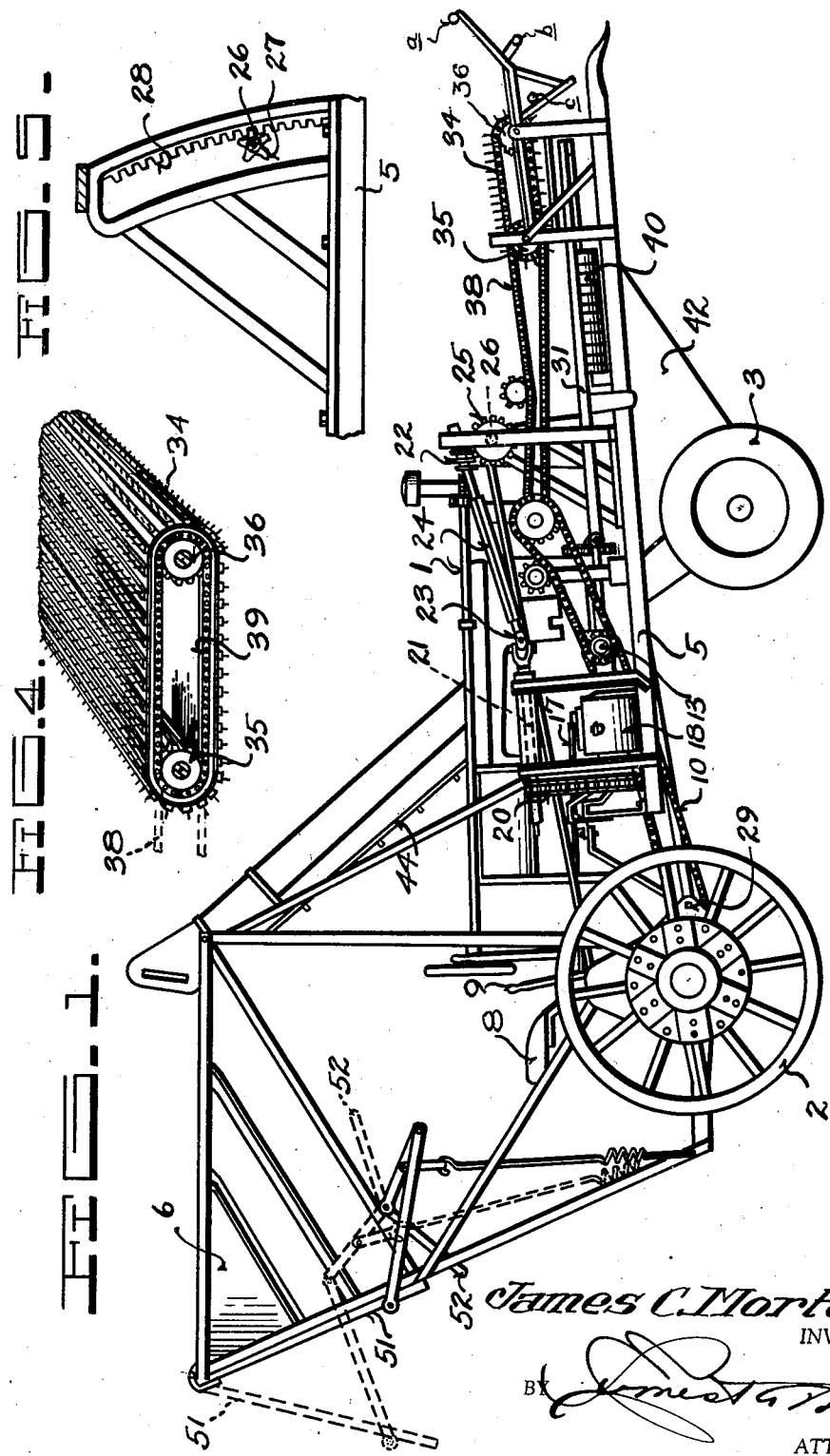

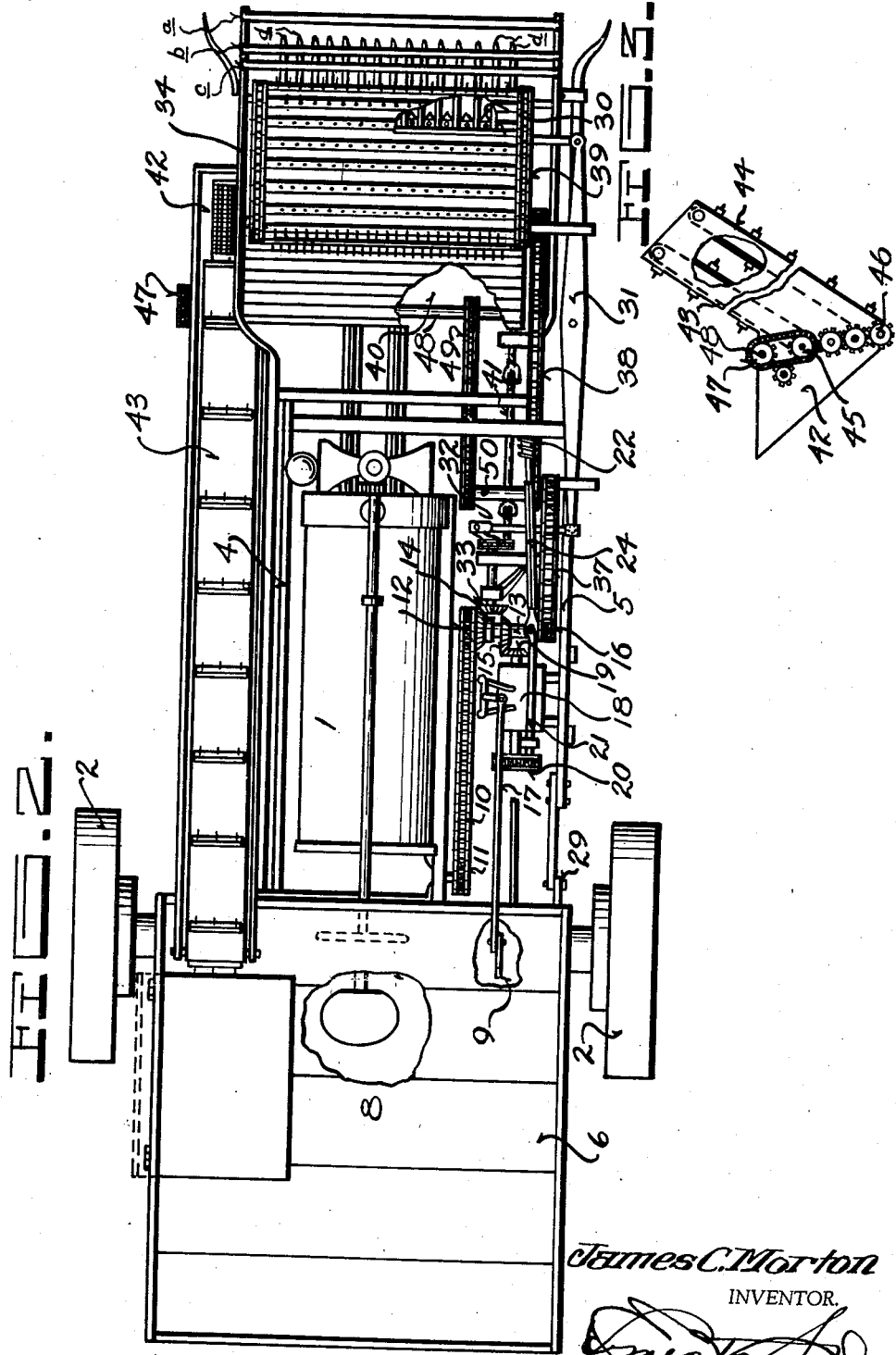

2,217,916

UNITED STATES PATENT OFFICE 2,217,916

ROW CROP HEADER

James C. Morton, Goree, Tex., assignor of one-half to M. L. Cottingham, Oklahoma City, Okla.

Application June 3, 1938, Serial No. 211,506

1 Claim. (Cl. 56—15)

This invention relates to machines for harvesting row crops such as maize, kaffir corn, cane and other vegetation possessing top foliage used for forage and it has particular reference to such machines by which such harvesting may be made easier and more economical.

The principal object of the invention is to provide a machine for guiding the heads of the stalks of vegetation into the path of a cutting means and which guiding means is vertically adjustable so as to be manipulated vertically, in order that the cutting means may be maintained at all times just below the lowest heads, therefore severing only the top of the stalk for transfer to a point of delivery, thence into a wagon or other means of conveyance.

Another object of the invention is to provide power means for operating the severing means as well as improved mechanism for manipulating the same vertically with a minimum of manual effort.

Yet another object of the invention is to provide means in advance of a cutting means whereby heads of vegetation of varied heights are moved into a common plane prior to subjection to the action of said cutting means.

Another object of the invention is to provide, in addition to the foregoing, a conveyor and elevator by which the severed heads are transported to a receptacle suitably disposed rearwardly of the machine and arranged in such manner as to be self dumping.

Broadly, the invention seeks to improve upon the machine of analogous design and purpose described in the patent, No. 1,912,538, issued June 6, 1933 to J. C. Morton, the applicant herein.

With the foregoing objects as paramount, the invention has particular reference to its salient features of construction and arrangement of parts which will become manifest as the description proceeds, taken in connection with the accompanying drawings, wherein:

Figure 1 is a side elevation of a machine constructed according to the present invention.
Figure 2 is a plan view.

Figure 3 is a fragmentary view in section of the lower end of the elevator.

Figure 4 is a detail view in perspective of the feeder for guiding the heads to a sickle and subsequently placing them on a cross conveyor for delivery into a hopper, and Figure 5 is a detail view in elevation of one of the pair of racks and pinions for raising and lowering the severing and feeding means.
The machine is provided with a frame 4 and a super frame 5, the former supporting the receptacle or hopper 6 which receives the severed heads.

As the machine is moved along the row, the operator, stationed on seat 8 causes the forward portion of the attachment to be raised or lowered, when required, so that the cutting means is always just below the lowest heads, thereby to sever only the heads with as little of the stalks as possible. This is accomplished by means of the lever 9, to which reference will be later made. It will be understood that the lever 9 is moved only when it is necessary to change the height of the cutting and feeding assembly.

Referring to the mechanism for driving the cutter assembly, conveyor belt and elevator, it will be observed that a sprocket chain 10 embraces a sprocket 11 on a drive shaft of the tractor, and a sprocket 12 is positioned on a counter shaft 13. The counter shaft 13 carries the beveled gears 14, 15, and a sprocket 16. As heretofore explained, this raising and lowering of the cutting assembly is under the control of the operator through the medium of the lever 9, to which a rod 17 is attached. The latter rod is attached to the linkage shown in Figure 2, movement of which serves to actuate mechanism in a suitable gear box 18. In normal operation no drive is imparted through this gear box, and the beveled gear 19 acts as an idler. However, when it is required to raise or lower the cutting assembly and its attendant parts, the lever 9 is manually moved, either forward or backward as desired, which serves to impart a driving force in the desired direction to a sprocket chain 20 through the medium of the gear box 18.

This chain when actuated serves to rotate a shaft 21 which latter is connnected to a worm gear 22 through the medium of a universal joint 23 and a squared or splined shaft 24.

The worm gear 22 engages a worm wheel 25 which latter is attached to a vertically positioned shaft 26 illustrated in Figures 1 and 5. The latter shaft carries a pair of gears 27, positioned on each side of the assembly, which mesh with a pair of curved racks 28, which racks are rigidly affixed to the super frame 5 of the machine. The radius of curvature of the racks 28 is such that the gears 27 are always in mesh with the teeth of the racks 28. This curvature is required since the super frame 5 is pivotally mounted at 29 adjacent the rear axil of the tractor as shown in Figure 1. Thus it will be seen that the cutting and feeding assembly may be raised or lowered when necessary by the controlled rotation of the gear 27.

Referring to Figure 2 it will be seen that sickles 30 are actuated by the reciprocating motion of the arm 31 which is connected to a pitman assembly 32, the latter being actuated by reason of the drive between the beveled gear 33.

Transverse rods a, b and c are rigidly secured to the super frame 5 as shown in Figures 1 and 2. These rods serve to float down the high stalks and hold them down until they get to the bottom of the spiked feeder 34, which latter continues to hold them down and carry them to the sickle 30.

Forwardly projecting fingers d serve to lift any inclined stalks into an upright position as the machine progresses along the rows prior to the subjection of the heads to the action of the sickle 30.

The mechanism by which the heads are fed to the sickles and thence by reel action to a transverse conveyor belt is best illustrated in Figure 4. This mechanism is comprised of an endless and spiked feeder belt 34 which is made on sprocket chains which run on sprocket wheels 35 and 36. It will be understood that the gear ratios are so arranged that the under side of the spiked belt 34 travels backward at the same speed as the tractor is traveling forward. The feed is thus held down until it reached the sickles.

The severed heads which are thrown by the reel action of the spiked feeder belt 34 are deposited upon a transversely arranged conveyor 40, which latter is driven by a shaft 41, which shaft, being somewhat offset, is provided with a pair of universal joints as shown in Figure 2. Heads conveyed by the felt 40 are deposited within a hopper 42.

The means for elevating the heads deposited in the hopper 42 is illustrated fragmentarily in Figure 3 and is comprised primary of a pair of belts 43 and 44 which latter are driven by the rollers 45 and 46 respectively. The latter rollers are provided with a gear train assembly, as shown, which latter are driven by a sprocket chain 47 which is actuated by reason of rotation of a shaft 48. This shaft is rotated by a sprocket chain 49 which is driven through a stub shaft 50 and the gear and chain assembly illustrated in Figure 2.

It will be observed that the hopper 6 is provided with a gate 51 which may be manually opened from time to time to allow the contents of the receptacle to slide into a wagon or other suitable conveyance.

This operation is accomplished by movement of a hand lever 52 through the medium of the spring and linkage arrangement.

Manifestly, the construction as shown and described is capable of some modification and such modification as may be construed within the scope and meaning of the appended claim is also considered to be within the spirit and intent of the invention.

What is claimed is:

In combination with a tractor crop heading machine having a rearwardly pivoted frame carrying head severing means and guides on its forward end, apparatus for actuating said frame to raise and lower said head severing means and guide comprising transmission gears, a countershaft driven by the tractor drive of said machine and having connection with said transmission gears, a second shaft having connection with said transmission gears to be driven thereby, an extensible shaft universally connected to said second shaft and carrying a worm, a third shaft having a worm gear cooperating with said worm and carrying spaced gears, gear racks with whose gear teeth said latter gears enmesh whereby said racks will be moved vertically when said latter gears are rotated, to actuate said frame and manually operable means for shifting said transmission gears to operative and inoperative position.

JAMES C. MORTON.